United States Patent
Thybo

(10) Patent No.: US 9,285,035 B2
(45) Date of Patent: Mar. 15, 2016

(54) VALVE FOR A VAPOUR COMPRESSION SYSTEM

(75) Inventor: Claus Thybo, Soenderborg (DK)

(73) Assignee: Danfoss A/S, Nordborg (DK)

( * ) Notice: Subject to any disclaimer, the term of this patent is extended or adjusted under 35 U.S.C. 154(b) by 658 days.

(21) Appl. No.: 13/257,086

(22) PCT Filed: Mar. 15, 2010

(86) PCT No.: PCT/DK2010/000031
§ 371 (c)(1),
(2), (4) Date: Dec. 2, 2011

(87) PCT Pub. No.: WO2010/105623
PCT Pub. Date: Sep. 23, 2010

(65) Prior Publication Data
US 2012/0060542 A1    Mar. 15, 2012

(30) Foreign Application Priority Data
Mar. 17, 2009    (DK) ................................ 2009 00371

(51) Int. Cl.
*F16K 1/02* (2006.01)
*F16K 1/34* (2006.01)
*F16K 31/00* (2006.01)

(52) U.S. Cl.
CPC ... *F16K 1/02* (2013.01); *F16K 1/34* (2013.01); *F16K 31/002* (2013.01); *Y10T 137/86734* (2015.04); *Y10T 137/86863* (2015.04)

(58) Field of Classification Search
CPC ........... F16K 1/02; F16K 1/34; F16K 31/002; F16K 11/074; F16K 11/0743; F25B 41/062
USPC ................ 137/625.3, 625.33, 625.46; 62/527
See application file for complete search history.

(56) References Cited

U.S. PATENT DOCUMENTS

2002/0066276 A1    6/2002  Kawano et al.
2002/0194864 A1*  12/2002  Hirota et al. .................... 62/498

FOREIGN PATENT DOCUMENTS

GB    1170463        11/1969
JP    2000055510 A    2/2000

(Continued)

OTHER PUBLICATIONS

International Search Report for Serial No. PCT/DK2010/000031 dated May 27, 2010.

*Primary Examiner* — John Fox
*Assistant Examiner* — Michael R Reid
(74) *Attorney, Agent, or Firm* — McCormick, Paulding & Huber LLP

(57) ABSTRACT

A valve comprising an inlet opening adapted to receive fluid medium and at least two outlet openings, each being fluidly connected to a flow path being arranged fluidly in parallel, is disclosed. The valve comprises a first valve part (1) and a second valve part (3). The first valve part (1) has at least two flow passages (2) formed therein, each flow passage (2) being fluidly connected to one of the outlet openings. The second valve part (3) has at least one primary flow passage (4) and at least one secondary flow passage (5, 6, 7) formed therein, the primary flow passage(s) (4) and the secondary flow passage(s) (5, 6, 7) being fluidly connected to the inlet opening. The first valve part (1) and the second valve part (3) are movable relative to each other in such a manner that the mutual position of the first valve part (1) and the second valve part (3) determines a fluid flow between the inlet opening and each of the outlet openings, via the flow passages (2, 4, 5, 6, 7) of the first valve part (1) and the second valve part (3).

15 Claims, 6 Drawing Sheets

(56) References Cited

FOREIGN PATENT DOCUMENTS

| JP | 2008064413 A | 3/2008 |
|---|---|---|
| WO | 2006021071 A1 | 3/2006 |
| WO | 2008/154919 A2 | 12/2008 |
| WO | 2010025727 A2 | 3/2010 |

* cited by examiner

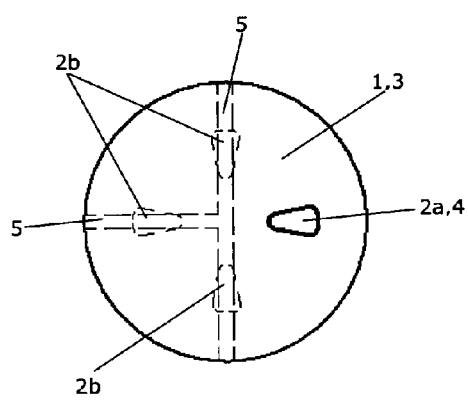
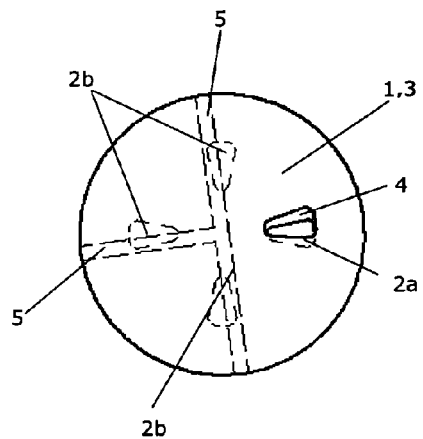
Fig. 2a    Fig. 2b
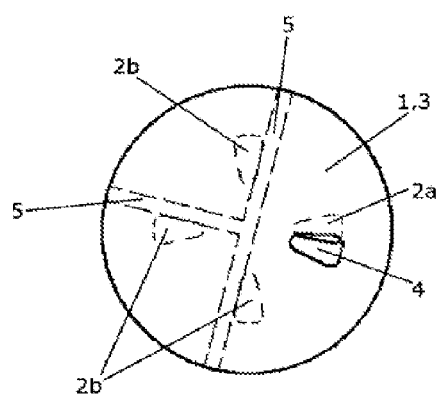
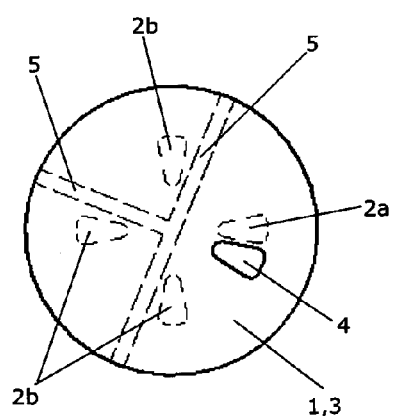
Fig. 2c    Fig. 2d

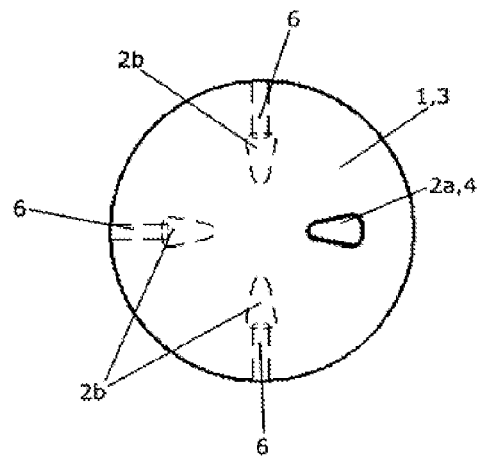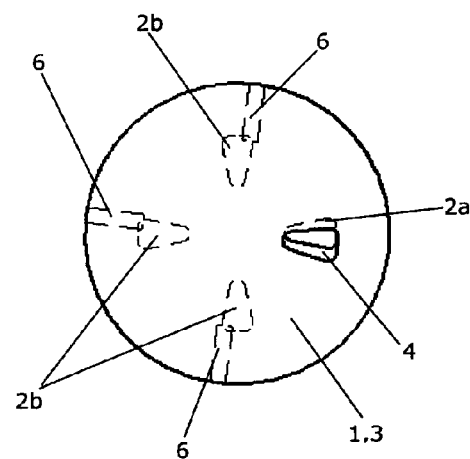
Fig. 4a             Fig. 4b
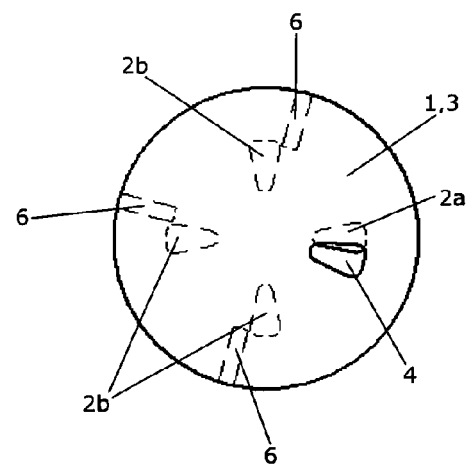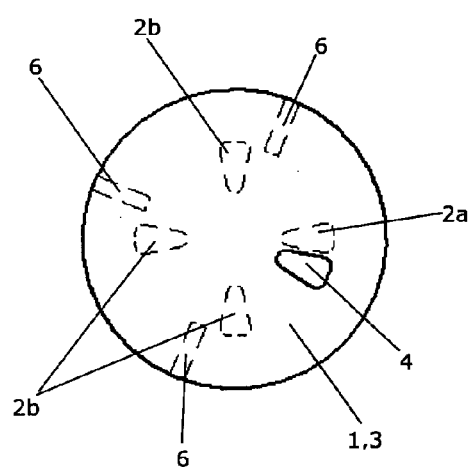
Fig. 4c             Fig. 4d

VALVE FOR A VAPOUR COMPRESSION SYSTEM

CROSS REFERENCE TO RELATED APPLICATIONS

This application is entitled to the benefit of and incorporates by reference essential subject matter disclosed in International Patent Application No. PCT/DK2010/000031 filed on Mar. 15, 2010 and Danish Patent Application No. PA 2009 00371 filed Mar. 17, 2009.

FIELD OF THE INVENTION

The present invention relates to a valve, in particular an expansion valve. The valve of the present invention is adapted to distribute fluid flow between at least two flow paths which are arranged fluidly in parallel. When using the valve of the present invention, the fluid flow delivered to the at least two flow paths is smoother as compared to the fluid flow delivered by prior art valves. The valve of the present invention may advantageously be used in a vapour compression system, such as a refrigeration system.

BACKGROUND OF THE INVENTION

In a fluid circuit, such as a refrigerant circuit of a vapour compression system, it is sometimes desirable to split the flow path into two or more parallel flow paths along part of the fluid circuit. This is, e.g., the case in vapour compression systems comprising two or more evaporators arranged in parallel. It may further be desirable to be able to control the fluid flow to each of the parallel flow paths, e.g. in such a manner that a substantially equal fluid distribution is obtained, or in such a manner that the system is operated in an optimum manner, e.g. in terms of energy consumption or efficiency.

In some previous attempts to control distribution of refrigerant between two or more parallel flow paths in a vapour compression system, a distributor is arranged downstream relative to an expansion valve in the refrigerant flow path. Thus, the refrigerant is distributed after expansion of the refrigerant, i.e. the refrigerant is mainly gaseous. This has the disadvantage that it is very difficult to control the flow of refrigerant to obtain a substantially equal distribution between the parallel flow paths.

In other previous attempts to control distribution of refrigerant between two or more parallel flow paths in a vapour compression system, a single inlet opening is moved between two or more outlet openings, each outlet opening being fluidly connected to one of the parallel flow paths, in such a manner that fluid medium is sequentially supplied to the parallel flow paths, via the inlet opening and the corresponding outlet opening. Thereby fluid medium is supplied to a given flow path only when the inlet opening is arranged at a position where it establishes a fluid connection to the outlet opening corresponding to the given flow path. Furthermore, when the inlet opening is arranged in a position where it establishes a fluid connection to a given flow path, none of the remaining flow path(s) receives fluid medium. This may result in the fluid flow delivered to the flow paths being relatively uneven.

SUMMARY OF THE INVENTION

It is an object of the invention to provide a valve adapted to distribute fluid flow between at least two parallel flow paths, the valve being capable of providing smooth fluid flows to the parallel flow paths.

It is a further object of the invention to provide a valve adapted to distribute fluid flow between at least to parallel flow paths, the valve being more compact than similar prior art valves.

It is an even further object of the invention to provide a valve adapted to distribute fluid flow between at least two parallel flow paths, where the motor force required for operation of the valve is reduced as compared to similar prior art valves.

According to the invention there is provided a valve comprising:

an inlet opening adapted to receive fluid medium at least two outlet openings, each being fluidly connected to a flow path, said at least two flow paths being arranged fluidly in parallel, each outlet opening being adapted to deliver fluid medium to one of the flow paths, a first valve part having at least two flow passages formed therein, each flow passage being fluidly connected to one of the outlet openings, a second valve part having at least one primary flow passage and at least one secondary flow passage formed therein, the primary flow passage(s) and the secondary flow passage(s) being fluidly connected to the inlet opening, the first valve part and the second valve part being movable relative to each other in such a manner that the mutual position of the first valve part and the second valve part determines a fluid flow between the inlet opening and each of the outlet openings, via the flow passages of the first valve part and the second valve part.

The valve comprises an inlet opening and at least two outlet openings. Fluid medium enters the valve via the inlet opening, and fluid medium leaves the valve via the outlet openings. In the present context the term 'fluid medium' should be interpreted to be a medium which is in a liquid state, in a gaseous state or a mix of medium in a liquid state and a gaseous state. It should be noted that the state of the fluid medium leaving the valve is not necessarily the same as the state of the fluid medium entering the valve. This will be explained in further detail below.

The inlet opening may be fluidly connected to a supply of fluid medium, e.g. a reservoir or a flow path of a flow system, such as a refrigerant path of a vapour compression system.

Each of the outlet openings is connected to a flow path. The flow paths are arranged fluidly in parallel. The flow paths are parallel in the sense that fluid can flow along the flow paths in a parallel manner. Thus, fluid medium flowing through a given outlet opening is delivered to the flow path which that outlet opening is connected to. Accordingly, fluid medium entering the valve is distributed, by the valve, between the parallel flow paths.

In the case that the valve is arranged in a vapour compression system, such as a refrigeration system, an air condition system or a heat pump, the parallel flow paths may, e.g., be two or more evaporators arranged fluidly in parallel in the vapour compression system, or two or more parallel evaporator coils of an evaporator.

The valve comprises a first valve part and a second valve part. The first valve part has at least two flow passages formed therein. The flow passages allow fluid medium to pass the first valve part. Each of the flow passages is fluidly connected to one of the outlet openings. Accordingly, fluid medium passing the first valve part via a given flow passage, leaves the valve through the corresponding outlet opening and enters the corresponding flow path.

The second valve part has at least one primary flow passage and at least one secondary flow passage formed therein. The primary and secondary flow passages are fluidly connected to the inlet opening. Thus, the primary and secondary flow passages allow fluid medium received from the inlet opening to pass the second valve part. In the present context the term 'primary flow passage' and 'secondary flow passage' should be interpreted in the following manner. Each of the primary flow passage(s) is adapted to allow a primary part, i.e. a significant part, of the fluid medium received from the inlet opening to pass the second valve part. Each of the secondary flow passage(s), on the other hand, is only adapted to allow a secondary part, i.e. a smaller part, of the fluid medium received from the inlet opening to pass the second valve part.

The first valve part and the second valve part are movable relative to each other. This may be achieved by mounting the first and/or the second valve part in a manner which allows it/them to move relative to the remaining parts of the valve. Thus, the first valve part may be movable while the second valve part is mounted in a fixed manner. As an alternative, the second valve part may be movable while the first valve part is mounted in a fixed manner. Finally, both of the valve parts may be movably mounted. In all of the situations described above a relative movement between the first valve part and the second valve part is possible, thereby defining a mutual position of the first valve part and the second valve part. This mutual position determines a fluid flow between the inlet opening and each of the outlet openings. The fluid flow passes the valve via the flow passages of the first valve part and the second valve part. Thus, the flow of fluid medium, including the distribution of fluid medium between the parallel flow paths, can be adjusted by adjusting the mutual position of the first valve part and the second valve part.

When the first valve part and the second valve part are moved relative to each other, the flow passages formed in the first valve part and the flow passages formed in the second valve part are also moved relative to each other. Accordingly, the mutual position of the first valve part and the second valve part determines the mutual positions of each of the flow passages formed in the first valve part and each of the flow passages formed in the second valve part. This may include determining whether or not one or more fluid connections are established between the flow passages formed in the first valve part and the flow passages formed in the second valve part, and whether or not a primary flow passage or a secondary flow passage of the second valve part is fluidly connected to a given flow passage of the first valve part. For instance, if a primary flow passage of the second valve part is fluidly connected to a given flow passage of the first valve part, it must be expected that a major part of the fluid medium received from the inlet opening is distributed to the flow path which is fluidly connected to the given flow passage. Similarly, if a secondary flow passage of the second valve part is fluidly connected to a given flow passage of the first valve part, it must be expected that a minor part of the fluid medium received from the inlet opening is distributed to the flow path which is fluidly connected to the given flow passage. Finally, if a given flow passage of the first valve part is neither fluidly connected to a primary flow passage, nor to a secondary flow passage of the second valve part, it must be expected that the corresponding flow path does not receive any fluid medium.

Accordingly, the design of the flow passages, in particular the flow rates defined by the secondary flow passage(s) formed in the second valve part relative to the flow rates defined by the primary flow passage(s) formed in the second valve part, determines the distribution of fluid medium between the parallel flow paths corresponding to a given mutual position of the first valve part and the second valve part. The distribution of fluid medium between the parallel flow paths during operation of the valve can thereby be controlled by controlling the mutual position of the first valve part and the second valve part, with due consideration to the design of the flow passages. For instance, a given flow passage of the first valve part may receive a large portion of fluid medium via a primary flow passage of the second valve part, and this large portion may be 'topped up' by smaller portions of fluid medium delivered via one or more secondary flow passages of the second valve part before a larger portion is again delivered via a primary flow passage. This allows the valve to provide smooth fluid flows to the parallel flow paths.

Furthermore, since the secondary flow passage(s) is/are adapted to allow smaller amounts of fluid medium to pass than the primary flow passage(s), a secondary flow passage must be expected to take up less area on the second valve part than a primary flow passage. This allows the flow passages of the second valve part to be accommodated within a small area, and the overall size of the second valve part can thereby be decreased as compared to prior art valves. Thereby the valve can be made more compact than prior art valves.

Finally, the compact design of the valve allows the valve to be operated with a reduced motor force as compared to similar prior art valves.

The valve may be an expansion valve, in which case the inlet opening may be adapted to receive fluid medium in a liquid state, and the outlet openings may be adapted to deliver fluid medium in an at least partly gaseous state.

In the present context the term 'liquid state' should be interpreted to mean that the fluid medium entering the expansion valve via the inlet opening is substantially in a liquid phase. Similarly, in the present context the term 'at least partly gaseous state' should be interpreted to mean that at least a part, e.g. a substantial part, of the volume of the fluid medium leaving the expansion valve is in a gaseous phase. Accordingly, at least a part of the fluid medium entering the expansion valve undergoes a phase transition from the liquid phase to the gaseous phase when passing through the expansion valve, i.e. the fluid medium undergoes expansion.

According to this embodiment, the distribution of the fluid medium between the parallel flow paths takes place either before or during expansion of the fluid medium. Thereby it is obtained that the fluid medium is distributed while at least a substantial part of it is in the liquid phase. This makes it easier to control the distribution. Furthermore, it makes the valve suitable for use in flow systems of the microchannel type.

Each primary flow passage may define a flow rate of fluid medium which is significantly larger than a flow rate defined by each of the secondary flow passage(s). According to this embodiment a major part of the fluid medium passing the second valve part flows via the primary flow passage(s), and only a minor part flows via the secondary flow passage(s).

According to one example, the valve may comprise four outlet openings, i.e. it may be adapted to distribute fluid medium between four parallel flow paths. In this case the first valve part comprises four flow passages. The second valve part may comprise one primary flow passage and three secondary flow passages. The flow passages of the first valve part and the second valve part may be arranged relative to each other in such a manner that when the primary flow passage is arranged in a position establishing a fluid connection to one of the flow passages of the first valve part, then each of the secondary flow passages is arranged in a position establishing a fluid connection to one of the three remaining flow passages of the first valve part. The supply of fluid medium to a given flow path may be regarded as an opening degree of the valve towards that flow path. In some cases the desired supply of fluid medium to the flow paths, and thereby the opening degree towards the flow paths, may vary from one flow path to the other thereby defining a desired distribution key for distributing fluid medium among the flow paths. In order to determine how to control the relative movements of the first valve part and the second valve part in order to obtain a desired distribution of fluid medium between the flow paths, the following equation system must be solved:

$$\begin{bmatrix} OD1 \\ OD2 \\ OD3 \\ OD4 \end{bmatrix} = \begin{bmatrix} h1 & h2 & h3 & h4 \\ h4 & h1 & h2 & h3 \\ h3 & h4 & h1 & h2 \\ h2 & h3 & h4 & h1 \end{bmatrix} \cdot \begin{bmatrix} T1 \\ T2 \\ T3 \\ T4 \end{bmatrix},$$

where OD1, OD2, OD3 and OD4 represent the desired opening degree for each of the parallel flow paths, h1, h2, h3 and h4 represent the size of the four flow passages of the second valve part, and T1, T2, T3 and T4 represent the dwelling time of the valve parts at a certain mutual position. Thus, the dwelling times required in order to obtain the desired opening degree for each of the four parallel flow paths, can be found by solving the equation system T=inv(H)*OD.

In one example the sizes of the flow passages of the second valve part may be as follows:
  h1=0.7
  h2=0.1
  h3=0.1
  h4=0.1

In this case flow passage h1 is a primary flow passage and flow passages h2, h3 and h4 are secondary flow passages, the secondary flow passages being equal in size.

If the desired opening degrees are:
  OD1=0.15
  OD2=0.35
  OD3=0.25
  OD4=0.25 then the dwelling times required in order to obtain the desired opening degrees are:
  T1=0.0833
  T2=0.4167
  T3=0.2500
  T4=0.2500

In the example above, T, OD and H are relative values, i.e. the sum of T1 to T4 equals 1, the sum of OD1 to OD4 equals 1 and the sum of h1 to h4 equals 1.

At least one of the secondary flow passage(s) may be in the form of a groove formed in a surface part of the second valve part. This is an advantage in the case that the secondary flow passage(s) is/are very small, since it is relatively easy to prepare a groove with a given small cross sectional area in a surface part of an object.

Alternatively or additionally, at least one of the secondary flow passage(s) may be in the form of a through-going bore formed in the second valve part.

At least one of the flow passages of the first valve part may be in the form of a through-going bore formed in the first valve part. According to this embodiment the fluid medium passes through the first valve part, via said flow passage(s).

The flow passages of the first valve part may define substantially identical flow rates. This may, e.g., be obtained by providing flow passages of substantially identical size and shape. According to this embodiment, the amount of fluid medium supplied to each of the parallel flow paths is completely determined by a combination of the flow rates defined by the primary and secondary flow passages of the second valve part and the moving pattern of the relative movement of the first valve part and the second valve part.

The first valve part and the second valve part may be adapted to perform relative rotational movements. In this case the first valve part and the second valve part may be disk shaped members, at least one of the disk shaped members being arranged rotatably about a common centre axis for the disk shaped members. According to this embodiment, the flow passages of the first valve part and the second valve part may advantageously be arranged on the respective valve parts in such a manner that the first and/or second valve part may be rotated into positions defining overlapping areas between an flow passage of the first valve part and a flow passage of the second valve part, thereby establishing a direct fluid connection between the overlapping flow passages. The overlapping area, in this case, defines the flow rate of fluid medium allowed to pass the valve via the overlapping flow passages.

The primary flow passage(s) and the secondary flow passage(s) may be arranged on the second valve part in such a manner that when a primary flow passage is arranged at a position corresponding to the position of a flow passage of the first valve part, at least one secondary flow passage is arranged at a position corresponding to another flow passage of the first valve part. According to this embodiment, a primary fluid flow is supplied to one of the parallel flow paths, while a secondary fluid flow is simultaneously supplied to another one of the parallel flow paths. Thereby a more even and smooth fluid flow is supplied to each of the parallel flow paths, and undesired variations in the fluid flow in the parallel flow paths are reduced.

The present invention further provides a vapour compression system comprising a compressor, a condenser, an evaporator comprising at least two evaporator coils, and a valve according to the invention, wherein the valve is fluidly connected to the evaporator in such a manner that each outlet opening is arranged in fluid communication with an evaporator coil. Thus, the valve of the invention is suitable for controlling a fluid distribution among parallel evaporator coils of an evaporator of a vapour compression system.

The vapour compression system may, e.g., be a refrigeration system, an air condition system or a heat pump.

BRIEF DESCRIPTION OF THE DRAWINGS

The invention will now be described in further detail with reference to the accompanying drawings in which FIGS. 2a-2d show the valve parts of FIGS. 1a and 1b at four different relative positions, FIGS. 4a-4d show the valve parts of FIGS. 3a and 3b at four different relative positions.

DETAILED DESCRIPTION OF THE PREFERRED EMBODIMENTS

Figure 1A:
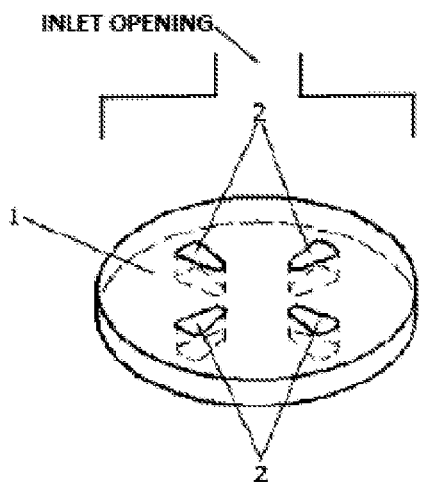
FIGS. 1a and 1b show a first valve part and a second valve part for a valve according to a first embodiment of the invention.

FIG. 1a is a perspective view of a first valve part 1 for use in a valve according to a first embodiment of the invention.

The first valve part 1 is a circular disk and is provided with four openings 2 in the form of through-going bores extending through the first valve part 1. The openings 2 have a tapered shape, i.e. the width of an opening 2 is smaller at a position close to the centre of the first valve part 1 than at a position close to the outer rim of the first valve part 1.

Figure 1B:
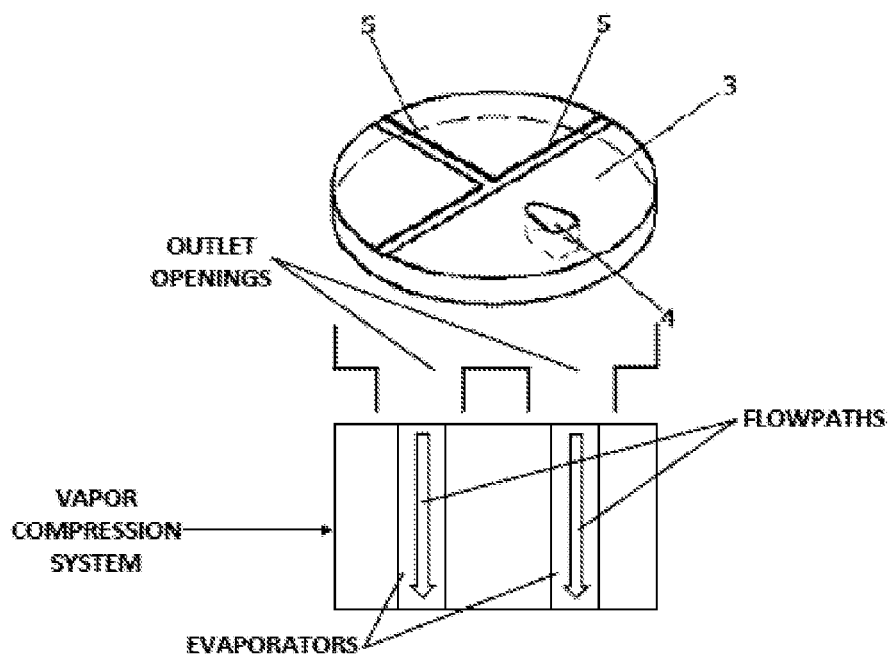

FIG. 1b is a perspective view of a second valve part 3 for use in a valve according to the first embodiment of the invention. The second valve part 3 of FIG. 1b is adapted to cooperate with the first valve part 1 of FIG. 1a. The second valve part 3 is also a circular disk and is identical in size and shape to the first valve part 1 of FIG. 1a. The second valve part 3 is provided with one primary opening 4 in the form of a through-going bore extending through the second valve part 3. The primary opening 4 is identical in size and shape to the openings 2 formed in the first valve part 1 of FIG. 1a. Furthermore, the primary opening 4 is arranged on the second valve part 3 at a position allowing it to overlap with one of the openings 2 formed in the first valve part 1 of FIG. 1a when the first valve part 1 and the second valve part 3 are arranged adjacent to each other with the centres of the disks arranged overlappingly.

The second valve part 3 is further provided with grooves 5 formed in a surface part of the second valve part 3. The grooves 5 form secondary flow passages of the second valve part 3. Due to the relatively small cross sectional area of the grooves 5, the flow rate of fluid passing through the grooves 5 is significantly lower than the flow rate of fluid passing through the primary opening 4. When the secondary flow passages are in the form of grooves, e.g. of the kind 5 shown in FIGS. 1a-2d, the fluid medium passing through the secondary flow passages flows into the secondary flow passages from a side portion of the second valve part 3.

FIGS. 2a-2d illustrate the valve parts 1, 3 of FIGS. 1a and 1b at four different mutual positions. The first valve part 1 and the second valve part 3 are arranged adjacent to each other in such a manner that the surface areas of the valve parts 1, 3 completely overlap. At least one of the valve parts 1, 3 is mounted in such a manner that it can perform rotational movements relative to the other valve part 3, 1 about an axis extending through the centre of both valve parts 1, 3, in a direction which is substantially perpendicular to the outer surfaces of the disks. The second valve part 3 is arranged in such a manner that the surface having the grooves 5 formed therein faces the first valve part 1, thereby allowing fluid flow between the first valve part 1 and the second valve part 3 via the grooves 5.

In FIG. 2a the mutual position of the first valve part 1 and the second valve part 3 is such that the primary opening 4 is arranged completely overlappingly with one of the openings 2a of the first valve part 1. The grooves 5 are arranged in such a manner that a maximum possible overlap is defined between each of the remaining openings 2b of the first valve part 1 and one of the grooves 5. When the first valve part 1 and the second valve part 3 are arranged in this mutual position, a maximum flow rate of fluid medium is supplied to the flow path which is fluidly connected to the opening 2a which is arranged overlappingly with the primary opening 4. A smaller flow rate of fluid medium is simultaneously supplied to each of the flow paths being fluidly connected to the openings 2b which are arranged overlappingly with the grooves 5.

In FIG. 2b the mutual position of the first valve part 1 and the second valve part 3 has been changed slightly by rotating the first valve part 1 or the second valve part 3. Thereby the primary opening 4 and the opening 2a of the first valve part 1 are no longer completely overlapping, though an overlapping area is still defined. Similarly, the overlap defined between each of the remaining openings 2b of the first valve part 1 and the grooves 5 has also been decreased. Thus, the flow rate of fluid supplied to each of the parallel flow paths being fluidly connected to the openings 2 is reduced as compared to the situation illustrated in FIG. 2a. However, the flow rate of fluid supplied to the flow path being fluidly connected to the opening 2a of the first valve part 1 is still significantly larger than the flow rate of fluid supplied to each of the flow paths being fluidly connected to the remaining openings 2b of the first valve part 1.

In FIG. 2c the first valve part 1 or the second valve part 3 has been rotated even further. Thereby the openings 2b of the first valve part 1 are no longer arranged overlappingly with the grooves 5, i.e. fluid is not supplied to the flow paths being fluidly connected to the openings 2b of the first valve part 1. However, an overlapping area between the opening 2a of the first valve part 1 and the primary opening 4 of the second valve part 3 is still defined, even though the overlapping area is very small. Thus, a small flow rate of fluid flow is supplied to the flow path being fluidly connected the opening 2a of the first valve part 1.

In FIG. 2d the first valve part 1 or the second valve part 3 has been rotated even further. In FIG. 2d none of the openings 2 of the first valve part 1 is arranged overlappingly with any of the flow passages 4, 5 of the second valve part 3. Accordingly, fluid is not allowed to pass the valve, and the valve is therefore in a closed position.

Figure 3A:
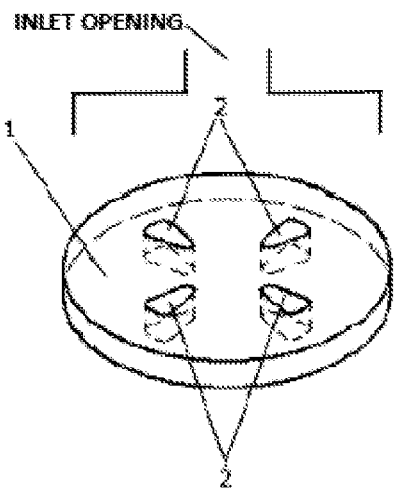
FIGS. 3a and 3b show a first valve part and a second valve part for a valve according to a second embodiment of the invention.

FIG. 3a is a perspective view of a first valve part 1 for use in a valve according to a second embodiment of the invention. The first valve part 1 of FIG. 3a is identical to the first valve part 1 of FIG. 1a, and it will therefore not be described in detail here.

Figure 3B:
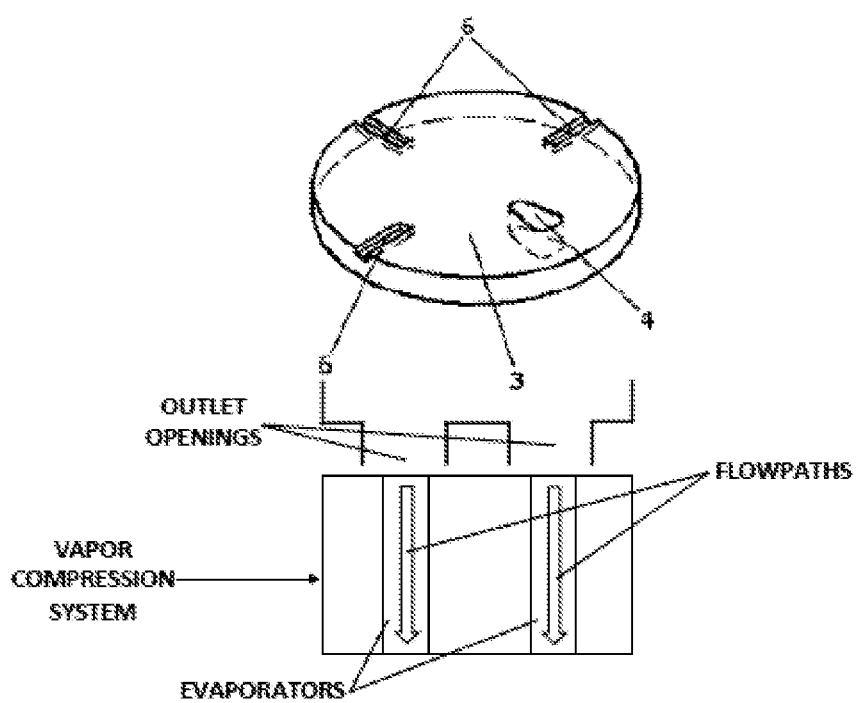

FIG. 3b is a perspective view of a second valve part 3 for use in a valve according to the second embodiment of the invention. The second valve part 3 of FIG. 3b is adapted to cooperate with the first valve part 1 of FIG. 3a, similarly to the situation described above with reference to FIGS. 1a and 1b. The second valve part 3 of FIG. 3b is very similar to the second valve part 3 of FIG. 1b, and it will therefore not be described in detail here.

Similarly to the second valve part 3 of FIG. 1b, the second valve part 3 of FIG. 3b is provided with one primary opening 4 in the form of a through-going bore extending through the second valve part 3, the primary opening 4 being identical in size and shape to the openings 2 formed in the first valve part 1 of FIG. 3a.

The second valve part 3 is further provided with grooves 6 formed in a surface part of the second valve part 3, and extending from an outer rim of the second valve part 3 towards the centre of the second valve part 3, without intersecting. The grooves 6 form secondary flow passages of the second valve part 3. Due to the relatively small cross sectional area of the grooves 6, the flow rate of fluid passing through the grooves 6 is significantly lower than the flow rate of fluid passing through the primary opening 4.

FIGS. 4a-4d illustrate the valve parts 1, 3 of FIGS. 3a and 3b at four different mutual positions, similarly to FIGS. 2a-2d. The second valve part 3 is arranged in such a manner that the surface having the grooves 6 formed therein faces the first valve part 1, thereby allowing fluid to enter between the first valve part 1 and the second valve part 3 via the grooves 6.

In FIG. 4a the mutual position of the first valve part 1 and the second valve part 3 is such that the primary opening 4 is arranged completely overlappingly with one of the openings 2a of the first valve part 1. The grooves 6 are arranged in such a manner that a maximum possible overlap is defined between each of the remaining openings 2b of the first valve part 1 and one of the grooves 6. Due to the limited extent of the grooves 6, as compared to the extent of the grooves 5 of the first embodiment of the invention shown in FIGS. 1a-2d, the maximum overlap between the openings 2b and the grooves 6 is very small. Thus, when the first valve part 1 and the second valve part 3 are arranged in this mutual position, a maximum flow rate of fluid medium is supplied to the flow path which is fluidly connected to the opening 2a which is arranged overlappingly with the primary opening 4. A smaller flow rate of fluid medium is simultaneously supplied to each of the flow paths being fluidly connected to the openings 2b which are arranged overlappingly with the grooves 6. However, as compared to the first embodiment shown in FIGS. 1a-2d, the flow rate of fluid supplied via the secondary flow passages, i.e. the grooves 6, is much smaller, and the difference between the flow rate of fluid supplied via the primary opening 4 and the flow rate of fluid supplied via each of the grooves 6 is much more significant.

In FIG. 4b the mutual position of the first valve part 1 and the second valve part 3 has been changed slightly by rotating the first valve part 1 or the second valve part 3. This has caused the overlapping area between the opening 2a of the first valve part 1 and the primary opening 4, as well as the overlapping area between each of the remaining openings 2b of the first valve part 1 and the grooves 6 to decrease. However, an overlap is still present for each of the four openings 2.

In FIG. 4c the first valve part 1 or the second valve part 3 has been rotated further. There is no overlap between the openings 2b of the first valve part 1 and the grooves 6. Thus, fluid is not supplied to the flow paths being fluidly connected to the openings 2b. However, a small overlap is still present between the opening 2a of the first valve part 1 and the primary opening 4, and a small flow rate of fluid is therefore supplied to the flow path being fluidly connected to the opening 2a of the first valve part 1.

In FIG. 4d the first valve part 1 or the second valve part 3 has been rotated even further. In FIG. 4d none of the openings 2 of the first valve part 1 is arranged overlappingly with any of the flow passages 4, 6 of the second valve part 3. Accordingly, fluid is not allowed to pass the valve, and the valve is therefore in a closed position.

Figure 5A:
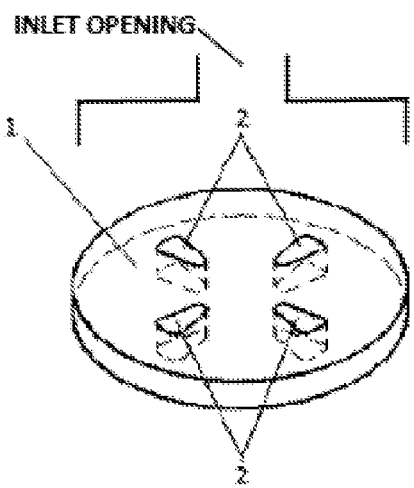
FIGS. 5a and 5b show a first valve part and a second valve part for a valve according to a third embodiment of the invention.

FIG. 5a is a perspective view of a first valve part 1 for use in a valve according to a third embodiment of the invention. The first valve part 1 of FIG. 5a is identical to the first valve part 1 of FIGS. 1a and 3a, and it will therefore not be described in detail here.

Figure 5B:
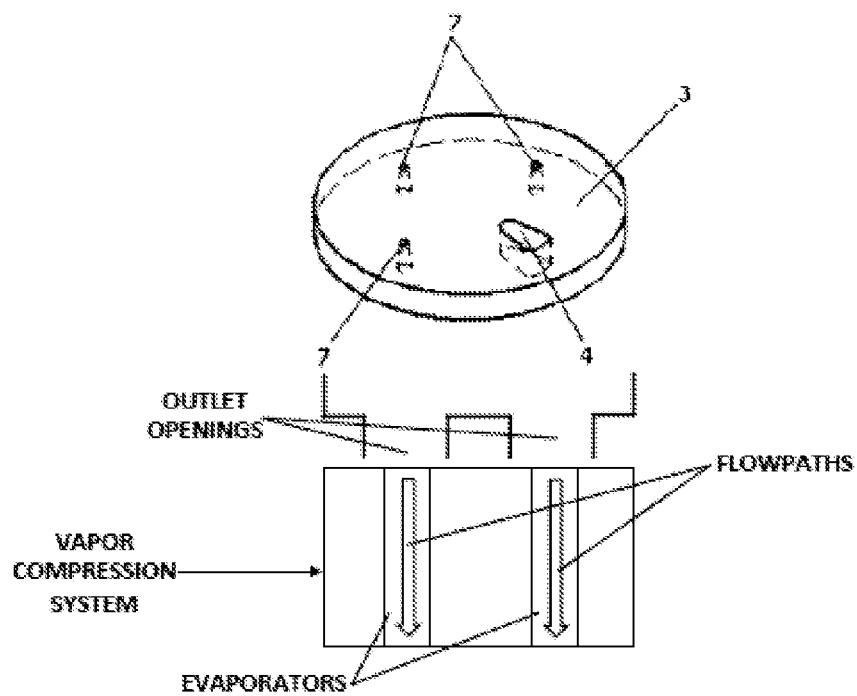

FIG. 5b is a perspective view of a second valve part 3 for use in a valve according to the third embodiment of the invention. The second valve part 3 of FIG. 5b is adapted to cooperate with the first valve part 1 of FIG. 5a, similarly to the situation described above with reference to FIGS. 1a and 1b. The second valve part 3 of FIG. 5b is very similar to the second valve part 3 of FIG. 1b, and it will therefore not be described in detail here.

Similarly to the second valve part 3 of FIG. 1b and the second valve part 3 of FIG. 3b, the second valve part 3 of FIG. 5b is provided with one primary opening 4 in the form of a through-going bore extending through the second valve part 3, the primary opening 4 being identical in size and shape to the openings 2 formed in the first valve part 1 of FIG. 5a.

The second valve part 3 is further provided with secondary flow paths in the form of three through-going bores 7 having a substantially circular cross section. The cross sectional area of each of the bores 7 is much smaller than the cross sectional area of the primary opening 4. The primary opening 4 is therefore capable of defining a much larger flow rate than each of the bores 7.

FIGS. 6a-6d illustrate the valve parts 1, 3 of FIGS. 5a and 5b at four different mutual positions, similarly to FIGS. 2a-2d and FIGS. 4a-4d.

Figure 6A:
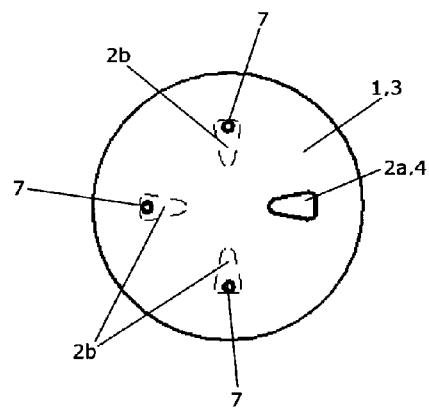
FIGS. 6a-6d show the valve parts of FIGS. 5a and 5b at four different relative positions.

In FIG. 6a the mutual position of the first valve part 1 and the second valve part 3 is such that the primary opening 4 is arranged completely overlappingly with one of the openings 2a of the first valve part 1. The bores 7 are arranged in such a manner that a maximum possible overlap is defined between each of the remaining openings 2b of the first valve part 1 and one of the bores 7. Due to the small cross sectional area of the bores 7, each bore 7 is entirely accommodated within the cross sectional area of an opening 2b of the first valve part 1, and the maximum overlapping area is therefore identical to the cross sectional area of a bore 7.

Thus, when the first valve part 1 and the second valve part 3 are arranged in this mutual position, a maximum flow rate of fluid medium is supplied to the flow path which is fluidly connected to the opening 2a which is arranged overlappingly with the primary opening 4. A smaller flow rate of fluid medium, determined by the cross sectional area of each bore 7, is simultaneously supplied to each of the flow paths being fluidly connected to the openings 2b which are arranged overlappingly with the bores 7.

Figure 6B:
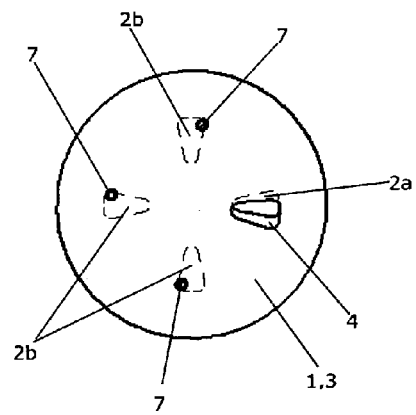

In FIG. 6b the mutual position of the first valve part 1 and the second valve part 3 has been changed slightly by rotating the first valve part 1 or the second valve part 3. This has caused the overlapping area between the opening 2a of the first valve part 1 and the primary opening 4, as well as the overlapping area between each of the remaining openings 2b of the first valve part 1 and the bores 7 to decrease. However, an overlap is still present for each of the four openings 2.

Figure 6C:
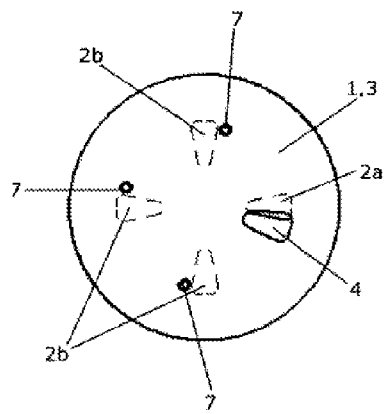

In FIG. 6c the first valve part 1 or the second valve part 3 has been rotated further. There is no overlap between the openings 2b of the first valve part 1 and the bores 7. Thus, fluid is not supplied to the flow paths being fluidly connected to the openings 2b. However, a small overlap is still present between the opening 2a of the first valve part 1 and the primary opening 4, and a small flow rate of fluid is therefore supplied to the flow path being fluidly connected to the opening 2a of the first valve part 1.

Figure 6D:
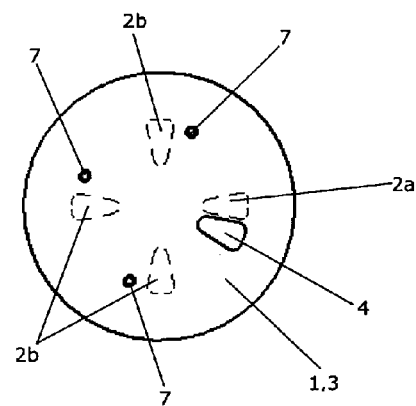

In FIG. 6d the first valve part 1 or the second valve part 3 has been rotated even further. In FIG. 6d none of the openings 2 of the first valve part 1 is arranged overlappingly with any of the flow passages 4, 7 of the second valve part 3. Accordingly, fluid is not allowed to pass the valve, and the valve is therefore in a closed position.

Although the invention above has been described in connection with preferred embodiments of the invention, it will be evident for a person skilled in the art that several modifications are conceivable without departing from the invention as defined by the following claims.

What is claimed is:

1. A valve for a vapour compression system, said valve comprising:
   an inlet opening adapted to receive fluid medium;
   at least two outlet openings, each being fluidly connected to one of two or more parallel flow paths in the vapour compression system, each outlet opening being adapted to deliver fluid medium to one of the two or more parallel flow paths in the vapour compression system, the two or more parallel flow paths comprising two or more evaporators, or two or more evaporator coils of an evaporator, arranged in parallel in the vapour compression system;
   a first valve part having at least two flow passages formed therein, each flow passage being fluidly connected to one of the outlet openings;

a second valve part having at least one primary flow passage and at least one secondary flow passage formed therein, the primary flow passage(s) and the secondary flow passage(s) being fluidly connected to the inlet opening, the first valve part and the second valve part being movable relative to each other in such a manner that the mutual position of the first valve part and the second valve part determines a fluid flow between the inlet opening and each of the outlet openings, via the flow passages of the first valve part and the second valve part;

wherein each primary flow passage defines a flow rate of fluid medium which is significantly larger than a flow rate defined by each of the secondary flow passage(s);

wherein each of the at least two flow passages of the first valve part is configured to be alternatingly fluidly connected to each of the at least one primary flow passage and at least one secondary flow passage of the second valve part;

so that, if one of the primary flow passage(s) of the second valve part is fluidly connected to a given flow passage of the first valve part, a major part of the fluid medium received from the inlet opening is distributed to the one of the primary flow passage(s) which is fluidly connected to the given flow passage; and so that, if one of the secondary flow passage(s) of the second valve part is fluidly connected to a given flow passage of the first valve part, a minor part of the fluid medium received from the inlet opening is distributed to the one of the secondary flow passage(s) which is fluidly connected to the given flow passage.

2. The valve according to claim 1, wherein the valve is an expansion valve, and wherein the inlet opening is adapted to receive the fluid medium in a liquid state, and the outlet openings are adapted to deliver the fluid medium in an at least partly gaseous state.

3. A valve for a vapour compression system, said valve comprising:

an inlet opening adapted to receive fluid medium;

at least two outlet openings, each being fluidly connected to a flow path, said at least two flow paths being arranged fluidly in parallel, each outlet opening being adapted to deliver fluid medium to one of the flow paths;

a first valve part having at least two flow passages formed therein, each flow passage being fluidly connected to one of the outlet openings;

a second valve part having at least one primary flow passage and at least one secondary flow passage formed therein, the primary flow passage(s) and the secondary flow passage(s) being fluidly connected to the inlet opening, the first valve part and the second valve part being movable relative to each other in such a manner that the mutual position of the first valve part and the second valve part determines a fluid flow between the inlet opening and each of the outlet openings, via the flow passages of the first valve part and the second valve part;

wherein each primary flow passage defines a flow rate of fluid medium which is significantly larger than a flow rate defined by each of the secondary flow passage(s);

so that, if one of the primary flow passage(s) of the second valve part is fluidly connected to a given flow passage of the first valve part, a major part of the fluid medium received from the inlet opening is distributed to the one of the primary flow passage(s) which is fluidly connected to the given flow passage; and so that, if one of the secondary flow passage(s) of the second valve part is fluidly connected to a given flow passage of the first valve part, a minor part of the fluid medium received from the inlet opening is distributed to the one of the secondary flow passage(s) which is fluidly connected to the given flow passage;

wherein at least one of the secondary flow passage(s) is in the form of a groove formed in a surface part of the second valve part.

4. The valve according to claim 1, wherein at least one of the secondary flow passage(s) is in the form of a through-going bore formed in the second valve part.

5. The valve according to claim 1, wherein at least one of the flow passages of the first valve part is in the form of a through-going bore formed in the first valve part.

6. The valve according to claim 1, wherein the flow passages of the first valve part define substantially identical flow rates.

7. The valve according to claim 1, wherein the first valve part and the second valve part are adapted to perform relative rotational movements.

8. The valve according to claim 7, wherein the first valve part and the second valve part are disk shaped members, at least one of the disk shaped members being arranged rotatably about a common centre axis for the disk shaped members.

9. The valve according to claim 1, wherein the primary flow passage(s) and the secondary flow passage(s) are arranged on the second valve part in such a manner that when one of the primary flow passage(s) is arranged at a position corresponding to the position of a flow passage of the first valve part, one of the secondary flow passage(s) is arranged at a position corresponding to another flow passage of the first valve part.

10. A vapour compression system comprising:
the valve according to claim 1;
a compressor;
a condenser;
the evaporator comprising the two or more evaporator coils; and
wherein the valve is fluidly connected to the evaporator in such a manner that each of the at least two outlet openings is arranged in fluid communication with one of the two or more evaporator coils.

11. The valve according to claim 1, wherein at least one of the secondary flow passage(s) is in the form of a groove formed in a surface part of the second valve part.

12. The valve according to claim 1, wherein the first valve part and the second valve part have the same number of flow passages.

13. The valve according to claim 12, wherein the flow passages of the second valve part are configured to simultaneously overlap with the flow passages of first valve part.

14. The valve according to claim 12, wherein the second valve part has only one primary flow passage.

15. The valve according to claim 12, wherein the flow passages of the first valve part all have the same shape and size; and wherein the primary flow passage of the second valve part has the same shape and size as the flow passages of the first valve part.

* * * * *